Patented July 2, 1935

2,006,841

UNITED STATES PATENT OFFICE 2,006,841

ARTIFICIAL RUBBER DISPERSION AND METHOD OF PREPARING THE SAME

Edward G. Partridge, Stow, Ohio, assignor to The B. F. Goodrich Company, New York, N. Y., a corporation of New York No Drawing. Application September 2, 1933, Serial No. 688,063

9 Claims. (Cl. 134—17)

This invention relates to aqueous dispersions of rubber or like substances and has for its principal objects the preparation of artificial rubber dispersions possessing superior qualities such as a high degree of stability and a substantial absence of odor, as well as the provision of a new method whereby such dispersions may be produced economically.

This invention consists essentially in dispersing rubber with the aid of a substantially neutral peptizing agent capable of ionizing in solution to furnish polyvalent negative ions. According to the method of the present invention, rubber to be dispersed is plasticized by mastication in conventional apparatus such as a rubber mixing mill or an internal mixer of the type commonly used for such work in the rubber industry, and a quantity, usually about five per cent. by weight with respect to the rubber, of a suitable dispersing agent is thoroughly mixed into the plasticized rubber. Monovalent soaps of oleic acid such as potassium oleate, sodium oleate, diethylamine oleate, ammonium oleate, triethanolammonium oleate, etc. are especially effective and preferred dispersing agents although other soaps such as the corresponding stearates, as well as other dispersing agents now used in similar processes including colloidal clays, glue, casein, etc. may be employed. The soaps may be added to the rubber as such, or suitable complementary reagents may be mixed into the rubber and allowed to react and form the soap in situ. Thereafter water is gradually worked into the mixture to form a water-in-rubber dispersion to which is added a peptizing agent of the type hereinabove mentioned which causes the phases of the dispersion to invert and produce a dispersion of rubber in water. It is not necessary to defer the addition of the peptizing agent until after a quantity of water has been dispersed in the rubber, but it may be dissolved in and added with the water, in which case inversion of the phases will occur when a sufficient quantity of the solution has been added and mixed into the rubber.

I have discovered a new class of materials which are particularly effective for use as peptizing agents in the above described process. As has been indicated, this class comprises water-soluble compounds capable of ionizing in solution to furnish polyvalent negative ions and which upon hydrolysis produce a substantially neutral or only slightly alkaline solution. Preferred examples of such materials are the alkali metal ferro- and ferri-cyanides, particularly sodium and potassium ferro- and ferri-cyanide, which salts are substantially neutral, and readily soluble in water, and which ionize to furnish respectively tetra-valent and tri-valent negatively charged ions.

While it is frequently desirable to prepare artificial dispersions of crude or reclaimed rubber, it is more often necessary in commercial work to prepare such dispersions of compounded or pigmented rubber compositions, and by way of example the present invention will now be described as applied to the preparation of a dispersion of such a composition.

A rubber composition containing 350.6 parts by weight of crude rubber, 100.0 parts of reclaimed rubber prepared from scrap inner tubes by the familiar "heater process", 5.6 parts of organic accelerator, 20.0 parts zinc oxide, 490.0 parts of inorganic pigment or filler, and 33.8 parts of a suitable softener, is thoroughly mixed in the usual manner. If the mixed batch is not already sufficiently plastic, or if it has been in storage, it is subjected to further mastication before proceeding with the preparation of the dispersion. The amount of mastication necessary to reduce the rubber to the required plastic condition will vary according to the particular grade crude rubber used, the composition of the rubber compound, and other factors including temperatures, the type and size of masticator employed, etc. but one familiar with the preparation of artificial rubber dispersions will be able to determine when the composition has been plasticized sufficiently. To 1000 grams of the plastic composition, is then added, with continued mechanical working, 7.0 grams of solid potassium hydroxide, followed, after the alkali has been worked into the rubber, with sufficient water (about 10 to 20 c. c.) to dissolve the alkali, and 35.2 grams of oleic acid. When the soap-forming ingredients have been thoroughly mixed into the rubber, 150 c. c. of a 5% acqueous solution of potassium ferrocyanide are gradually added to the batch still undergoing mechanical working. This quantity of peptizing agent is sufficient to cause the batch to invert and form a dispersion in which the rubber is in the dispersed phase, although the mixture is not fluid, but more nearly the consistency of putty. The plastic mass so produced then is diluted with an additional 100 c. c. of the 5% potassium ferrocyanide solution to produce a more nearly fluid dispersion which may be further diluted with water after its removal from the mixing apparatus to produce a flowable dispersion of a desired concentration and viscosity.

The product of the present invention exhibits numerous desirable properties. It is substantially free from objectionable odors; it does not exhibit a tendency to "skim over" upon standing exposed to the atmosphere; in the pasty condition it does not dry rapidly thus permitting the inclusion in a succeeding batch of waste remaining in the dispersing apparatus from a preceding batch; and it is somewhat cheaper to prepare than are prior dispersions.

The term "rubber" is used in the specification and claims in a generic sense to include compounded or uncompounded caoutchouc, gutta percha, balata, and like natural or synthetic gums or resins.

Although the present invention has been described in some detail with reference to a specific example illustrative of the invention, it is to be understood that changes may be made in the described procedure and that equivalent materials may be substituted for those mentioned without departing from the spirit and scope of the invention as defined in the appended claims.

I claim:

1. The method of dispersing rubber in an aqueous dispersion medium which comprises dispersing the aqueous medium in the rubber and then inverting the phases of the dispersion by admixing therewith a substantially neutral water-soluble peptizing agent capable of ionizing in solution to furnish polyvalent negative ions.

2. The method of dispersing rubber in an aqueous dispersion medium which comprises dispersing the aqueous medium in the rubber and then inverting the phases of the dispersion by admixing therewith a water-soluble peptizing agent selected from the class consisting of alkali metal ferrocyanides and alkali metal ferricyanides.

3. The method of dispersing rubber in an aqueous dispersion medium which comprises dispersing the aqueous medium in the rubber and then inverting the phases of the dispersion by admixing therewith a peptizing agent selected from the class consisting of the ferro- and ferri-cyanides of sodium and potassium.

4. The method which comprises mixing a dispersing agent into rubber and then adding sufficient water and substantially neutral water soluble peptizing agent capable of ionizing in solution to furnish polyvalent negative ions to invert the mixture and to form a dispersion of rubber in water.

5. The method which comprises thoroughly mixing rubber and a dispersing agent and then adding to the mixture with additional mechanical working a quantity of water and of a water-soluble peptizing agent selected from the class consisting of alkali metal ferrocyanides and alkali metal ferricyanides sufficient to invert the mixture and to form a dispersion of rubber in water.

6. The method which comprises intimately mixing rubber and dispersing agent and then adding to the mixture with additional mechanical working a quantity of water and of a peptizing agent selected from the class consisting of the ferro- and ferri-cyanides of sodium and potassium sufficient to invert the mixture and to form a dispersion of rubber in water.

7. The method which comprises mixing into rubber a quantity of a monovalent soap and then adding with continued mixing a quantity of water and of a substantially neutral water soluble peptizing agent capable of ionizing in solution to furnish polyvalent negative ions sufficient to invert the mixture and to form a dispersion of rubber in water.

8. The method which comprises mixing into rubber a quantity of a monovalent soap and then adding with continued mixing a quantity of water and of a water-soluble peptizing agent selected from the class consisting of alkali metal ferrocyanides and alkali metal ferricyanides sufficient to invert the mixture and to form a dispersion of rubber in water.

9. The method which comprises mixing into rubber a quantity of a monovalent soap and then adding with continued mixing a quantity of water and of a peptizing agent selected from the class consisting of the ferro- and ferri-cyanides of sodium and potassium sufficient to invert the mixture and to form a dispersion of rubber in water.

EDWARD G. PARTRIDGE.